United States Patent [19]
Chartet

[11] 3,893,611
[45] July 8, 1975

[54] JIG FOR BRAZING ELONGATED HEAT EXCHANGERS

[75] Inventor: André Chartet, Meudon, France

[73] Assignee: Societe Anonyme des Usines Chausson, Asnieres (Haut de Seine), France

[22] Filed: Aug. 15, 1973

[21] Appl. No.: 388,343

[30] Foreign Application Priority Data
Sept. 21, 1972 France .............................. 72.33494

[52] U.S. Cl.................. 228/44.1; 29/202 R; 29/493; 211/89; 269/254 R
[51] Int. Cl............................................. B23k 19/00
[58] Field of Search ......... 29/33 G, 202 R, 157.3 R, 29/202 J, DIG. 4, 493; 204/297 W; 118/503; 269/46, 254 R, 254 CS; 228/44; 211/89

[56] References Cited
UNITED STATES PATENTS

| | | |
|---|---|---|
| 1,533,805 | 4/1925 | Oliver ............................ 204/297 W |
| 1,750,807 | 3/1930 | Lichtman ....................... 204/297 W |
| 2,023,354 | 12/1935 | Cope................................. 228/44 X |
| 2,443,574 | 6/1948 | Burns............................. 29/157.3 R |
| 2,697,690 | 12/1954 | Beebe, Jr. ...................... 204/297 W |
| 3,726,466 | 4/1973 | Veeder et al. ................. 29/202 R X |

Primary Examiner—Roy Lake
Assistant Examiner—Neil Abrams
Attorney, Agent, or Firm—Browdy and Neimark

[57] ABSTRACT

The jig comprises vertical member supporting substantially U-shaped apertured holders in which are engaged the heat exchangers. During the heating step of the brazing process, the heat expansion to which the heat exchangers are submitted results in holding them between opposite legs of the U-shape of the holder. The holder resiliently engages the heat exchanger to maintain the parts thereof in contact during brazing while allowing enough expansion due to the heat of brazing to prevent deformation of the heat exchanger.

14 Claims, 6 Drawing Figures

PATENTED JUL 8 1975　　　　3,893,611
SHEET 3 OF 3
Fig. 5.
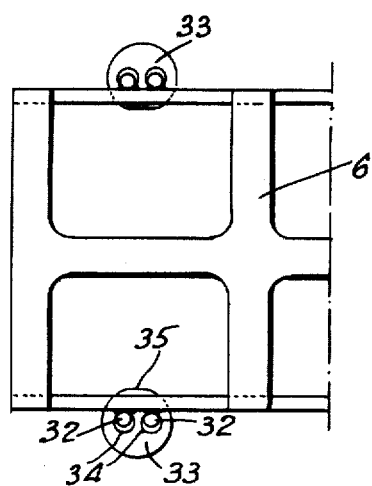
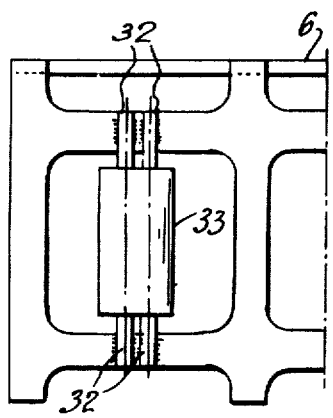
Fig. 6.

JIG FOR BRAZING ELONGATED HEAT EXCHANGERS

The present invention relates to a new brazing jig for use in the brazing of heat exchangers, preferably those made of aluminum containing alloys.

The invention relates, more especially, to a jig for use in the brazing of heat exchangers having a length much greater with respect to both their thickness and their width said heat exchangers being typically used for heating the inside of a vehicle.

Due to its constitution, the jig of the invention enables a simultaneous brazing of several heat exchangers and though said jig can be used for flux dip brazing, it is especially designed for brazing in an oven provided with a gaseous atmosphere. The constitution of the jig of the invention causes it to have a small heat inertia, which acts to substantially reduce the time duration of the brazing operations; this is beneficial to the quality of the joints so realized. Actually, the risk of damaging the metal, particularly the aluminum of which the exchangers are made becomes more and more important as both the rise in temperature and the maintainance at the brazing temperature are increased.

According to the invention, the jig for use in the brazing of elongated heat exchangers comprises two horizontal members connected together from place to place by elements such as bands, bars and thin plates, one of said horizontal members being provided with hanging devices and at least some of the connecting elements supporting holders comprising two generally horizontally extending plates spaced correspondingly to an interval separating the side flanges of the heat exchangers placed between the two plates.

Various other characteristics of the invention are moreover shown in the following detailed description.

Embodiments of the invention are shown by way of non restrictive examples in the accompanying drawing, in which: FIG. 1 is a side elevation sectional view of the jig of the invention especially designed for brazing in an oven.

FIG. 5 is a partial elevation view similar to FIG. 2 and showing an optional feature of the invention.

FIG. 6 is a plan view corresponding to FIG. 5.

Figure 1:
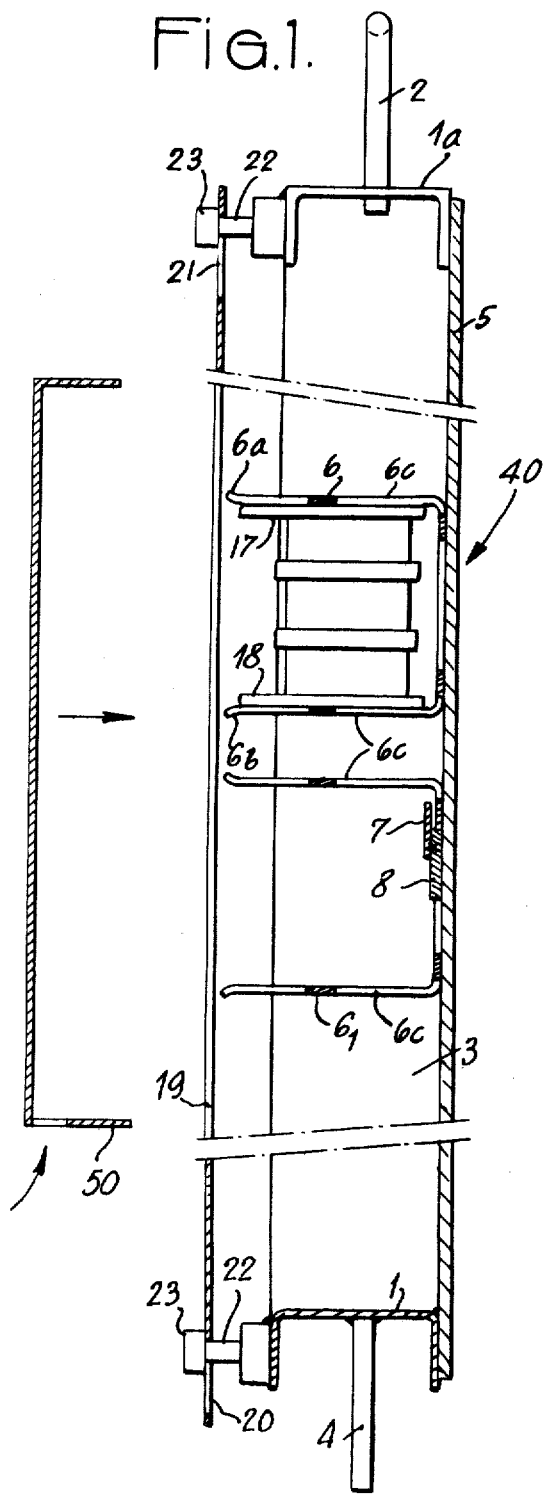

In the embodiment according to FIG. 1, the brazing jig 40 comprises a frame typically constituted by horizontal members 1, 1a which can have a U-shaped cross section, said horizontal members are connected at both ends thereof through upright parts 3, which can also have a U-shaped cross section. Legs or lugs 4 are advantageously placed on the lower horizontal member 1 to provide for putting the jigs 40 on the floor of the brazing oven if necessary, and also to make it possible to incline the jigs 40 with respect to the floor during the brazing treatment. Especially, if the heat exchangers must be brazed in an aqueous flux bath, it is advantageous that the jig 40, containing the heat exchanger, be inclinable to provide for the dripping of the heat exchangers, while said jig 40 is supported by lifting handles 2 fixed to the upper horizontal member 1a, said lifting handles being in use fixed to hooks of a conveyor.

From place to place, the horizontal members 1 and 1a are connected on one side by bands or bars 5 of which some are used as supports for holders 6, $6_1$ each shaped as a U-shaped clamp. The drawing shows that edges 6a, 6b of the lateral sides of the clamps are slightly widened to provide an easy placing of the heat exchangers as explained hereinbelow.

Figure 2:
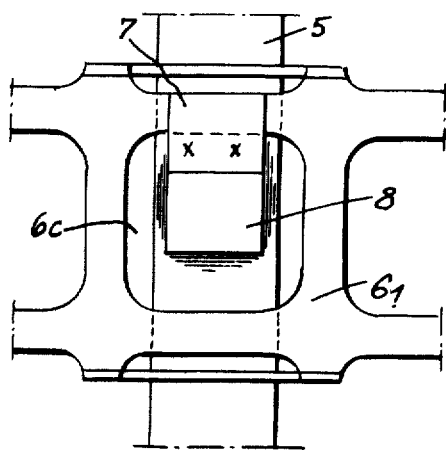
FIG. 2 is a partial elevation view rotated through 90° relative to FIG. 1 and shows a detail of the jig of FIG. 1.

The holders 6 and $6_1$ have openings 6c, preferably on all their periphery to let air pass therethrough and in order also that their heat inertia be as low as possible. If so required, they can be made of expanded metal (metal webbing). The holders 6, $6_1$ are either fixed as by welding, screwing or riveting to the bands or bars 5, or held in a removable way. When held in a removable way, as represented for the holder $6_1$ in FIG. 1 and as is also shown in FIG. 2, lugs 7 of small width are supported by shims 8 which are fixed, as by welding, to some of the bands 5 for example to two bands and then the holders are easily positioned the lugs 7 and shims 8 passing through one of the openings of the holder, as better shown in FIG. 2.

Figure 3:
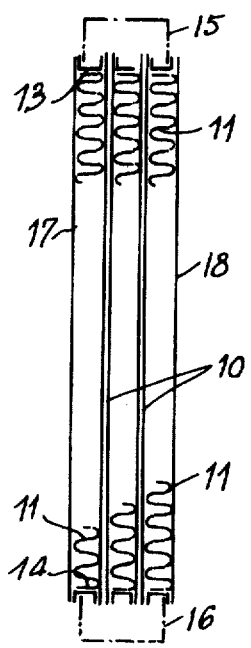
FIG. 3 is a diagrammatic view of a heat exchanger which is to be brazed, when held into the jig of FIG. 1.

The heat exchangers to be brazed in the jig 40 of the invention are, for example, constituted as schematically shown in FIG. 3 which shows a radiator having a great length with respect to the height thereof and comprising, for example, two tubes 10 surrounded by corrugated strips 11 and engaged in tube plates 13, 14 covered by header tanks 15, 16. Lateral flanges 17 and 18 are also designed to extend at least up to between the tube plates 13,14 and, if necessary, up to the header tanks 15,16. To obtain a suitable brazing these flanges 17,18 must be held applied on the corrugated strips 11 and end plates 13, 14 while said strips are also held applied on the whole length of the outer wall of the tubes, this hold having to be exerted during all the working process, i.e., up to end of the brazing process and, possibly, up to the washing operation, without any parts of the heat exchanger being able to move. This is actually the problem solved by the present invention.

The width of holders 6 or $6_1$ or the interval between their lateral sides as above described, is selected to enable each heat exchangers to be introduced with soft friction or with a very little clearance when they have just been assembled and while they are cold, each of the flanges 17,18 thereof being respectively placed against the lateral sides of the holder as shown in FIG. 1. The number of holders inside a frame forming a magazine may vary according to needs.

The length of the holders 6, $6_1$ is preferably selected at least equal to the length of the flanges, in order that the clamp forming holder will suitably hold them.

When all the heat exchangers have been placed in the frame, each one in one of the holders, at least one locking band or bar 19 is placed as shown in FIG. 1, said band or bar being provided, at the ends thereof, with oblong openings 20, 21 enabling them to slip on lugs 22 each having a retaining head 23. It is obvious that other means for removably setting the retaining band or bar 19 can be designed.

The jig 40, provided with heat exhangers at least partly covered with brazing alloy, is then either dipped into a bath of melted flux salts to perform the brazing together of the different parts of the heat exchanger, or, preferably, the jig 40 is hung onto a conveyor and is brought to a fluxing station and then led to an oven, such as oven 50 shown in FIG. 1, wherein the heat exchangers are heated up to the melting temperature of the brazing alloy covering the whole or a portion of the parts constituting it.

During the heating for effecting the brazing, said brazing being either performed in a bath of flux or in an oven, the heat exchangers are always submitted to heat expansion. The flanges 17, 18 thereby come into contact with the sides of the holders and are pressed against the holders which then also hold suitably fixed said flanges 17,18 on the two corrugated strips 11 adjacent to said flanges 17, 18, then the latter strips 11 on the tubes 10 adjacent thereto and so on.

The holders 6, 6$_1$ are made of metal or of a material having a heat expansion coefficient smaller than the heat expansion coefficient of the heat exchangers. For example if the heat exchangers are made of aluminum or of aluminum alloy, the holders 6, 6$_1$ as well as the other parts of the brazing jig 40 are advantageously made of stainless steel. It is also possible that the holders 6, 6$_1$ are provided — as below described in reference to FIGS. 5 and 6 — with elements made of earthenware or other material known to suitably resist high temperatures and the corrosive action of the flux generally used in a brazing process.

After cooling and possible washing of the heat exchangers, the same are removed from the holders, which does not offer any difficulty since cooling has made the metal of the heat exchangers contract, thus the heat exchangers are no longer held in said holders.

Figure 4:
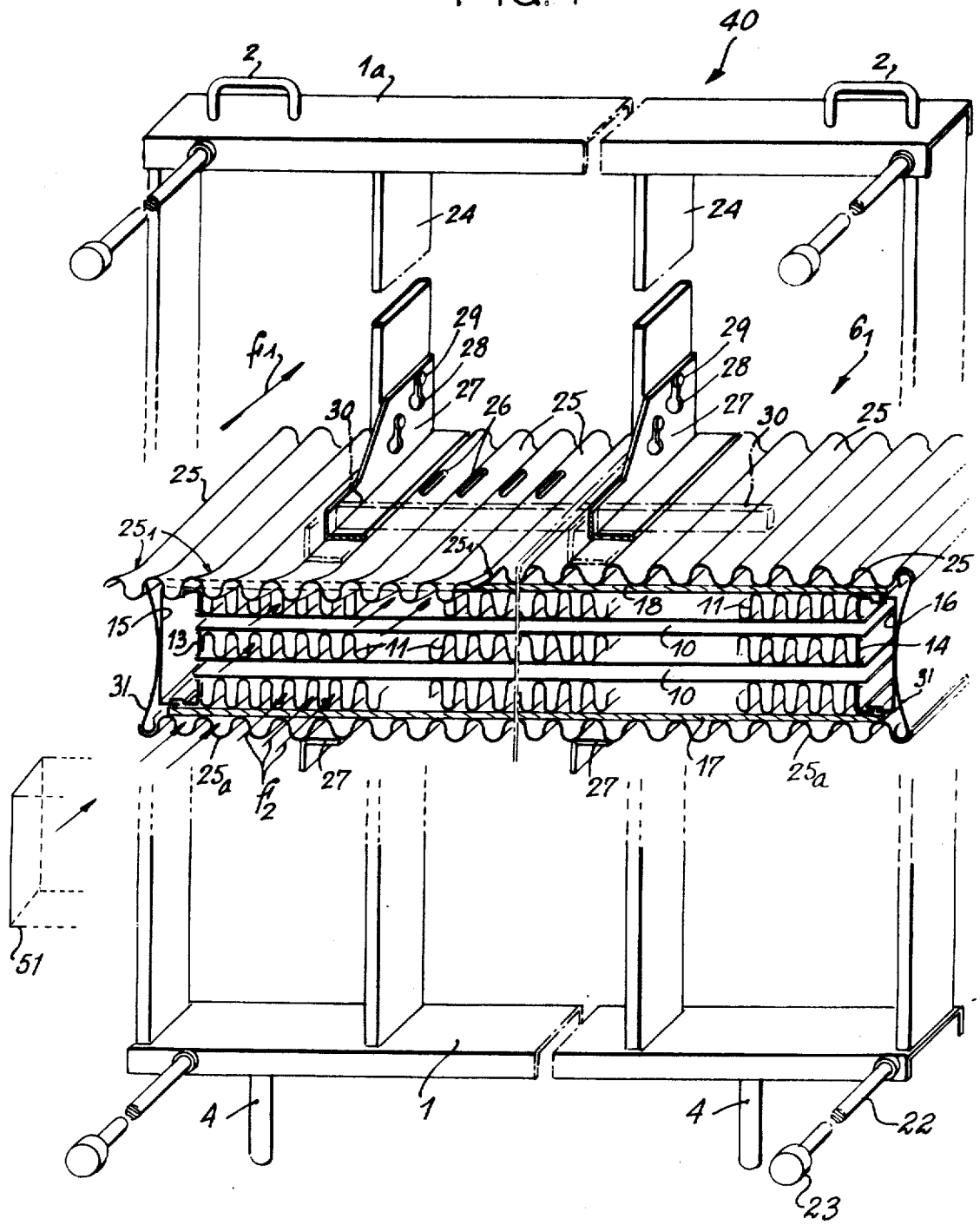
FIG. 4 is a partial perspective view showing a variant of the jig of FIG. 1.

FIG. 4 shows a variant of the jig 40 of FIG. 1, said variant being especially adapted for use in a brazing oven wherein heat exchangers are heated with pulsed hot gases. In such a case, the horizontal members 1, 1$a$ provided with handles or any other lifting element 2 and legs 4, are connected to each other by thin plates or tubes 24, which are used in place of the bars 5 of FIG. 1, having a rectangular or ovoid cross section and which are placed in a way to have their large width parallel to the direction of the flow of the small flows of gases which are pulsed into the oven by a means for forcing hot gas across the heat exchanger parts shown schematically at 51 in FIG. 4 in a direction shown by arrow $f_1$.

Thus, the plates 24 constitute directing blades and do not interfere with the circulation of the hot gases. Only one holder designated by 6$_1$ has been shown and said holder is then advantageously made up of two corrugated plates 25, 25$a$, which can be made of stainless steel and be provided with holes 26 in the corrugations thereof.

The corrugated plates 25, 25$a$ are respectively supported by arms 27 extending laterally from the plates 24 and of which the upper one has apertures 28 through which are passed protruding fingers 29 supported by at least in some of the blades 24. If so required, cross-bars 30, shown in phantom FIG. 4, can connect the extension arms 27 and said arms 20 are advantageously made in an angled shape. The apertures 28 provided in the arms 27 have an elongated narrow portion so that the arms 27 can slide up and down in the axial direction of the plates 24.

In addition, it is also advantageous that the front edge of the corrugated plates 25, 25$a$ be widened as shown at 25$_1$, which corresponds to the widened ends 6$a$, 6$b$ of the holders shown in FIG. 1. As previously, the heat exchangers, when prepared, are placed into holders 6, 6$_1$ with the flanges 17 and 18 of the heat exchanger of FIG. 3 being engaged between the plates 25$a$ and 25 respectively. FIG. 4 shows that said flanges can extend up to the header tanks 15, 16 to bear thereupon and also on the end plates 13, 14.

To maintain the header tanks 15, 16 well fixed to the end plates 13, 14, it is possible to use the corrugated shape of the plates 25, 25$a$ and to introduce therein resilient plates, 31 bearing on the header tank 15, 16 as shown on the left and on the right sides of FIG. 4.

Since the corrugated plate 25 can be axially moved up and down due to the relatively high apertures 28, then the weight of said plate 25 and of extension arms 27 is supported by the heat exchanger, thus maintaining the flanges 17, 18 well fixed on the corrugated strips 11 and the latter well fixed on the tubes 10. Besides, during the brazing process, the heat exchanger can be submitted to heat expansion which causes the plates 25 to slightly move up, the weight of said plate 25 being sufficiently small not to have any risk of permanently deforming some parts of the heat exchanger.

Since the plates 25, 25$a$ are corrugated, the gases pulsed as shown by arrows F2 according to the direction of arrow F1 pass not only between the heat exchanger tubes but also between said corrugated plates and the outer sides of the flanges 17, 18 thus providing a suitably steady heating of all the parts of the heat exchanger which is actually heated by flow of gases which cross it in the very same manner as the heat exchanger will be crossed through by streams of air when used in the cooling circuit of an engine.

If so required the plates 25, 25$a$ can be replaced by transverse bars supported by the cross-bars 30.

According to the development shown in FIGS. 5 and 6, the holders of FIG. 1 are provided, on their lateral sides, with lugs 32 for placing and holding studs 33 made of earthenware, glass, quartz or any material known to stand high temperatues without any damage and not to adhere to the brazing alloy. Preferably, the studs 33 are provided with holes 34 of a size bigger than the lugs 32 to be able to play with respect to said lugs, as well as flattened sections 35 forming a bearing surface for the heat exchangers to be held between them.

It is obvious that the studs 33 can have other shapes than the one which is represented, the shape of said studs typically depending on the shape of the heat exchangers having to be brazed.

The present invention is not restricted to the embodiments set out and described in detail, for various modifications can moreover be applied thereto without departing from the scope of the invention as shown in the appended claims.

I claim:

1. An installation for use in brazing by gas flow elongated heat exchangers having a piling of tubes separated by corrugated fins and enclosed between side flanges, comprising:

a jig with a lower member and an upper member connected by transverse elements, said transverse elements supporting at least one holder;

said holder comprising two horizontally extending plate elements, mounted on said transverse elements and abutting said transverse plate elements at one end of each of said horizontal plate elements, said plate elements being slightly movable and spaced apart by a distance slightly smaller than the width of the heat exchangers placed therebetween for brazing, whereby said plate elements slightly urge said side flanges, corrugated fins and tubes together during brazing while allowing enough expansion of said side flanges, corrugated fins and tubes due to the heat of brazing to prevent deformation of said side flanges, corrugated fins and tubes;

means for passing hot gas through the corrugated fins and tubes of the heat exchanger while the heat exchanger is in said holder, and wherein said holder is made up of two plates, an upper plate and a lower plate connected to said transverse elements through extension arms, supported on said plates and wherein said extension arms of at least said upper plate are movably mounted on said transverse elements to thereby allow at least said upper plate to move by translation in a direction substantially parallel to said transverse elements.

2. An installation as set forth in claim 1, wherein said two plates supported by said extension arms are made in a corrugated shape.

3. An installation as set forth in claim 1, wherein said upper and lower members include elements for supporting removable locking bars extending on the side of the holders which is opposite to the side thereof placed against said transverse members.

4. An installation as set forth in claim 2, wherein resilient blades are engaged between said two corrugated plates of said holder and the heat exchanger includes header tanks, said resilient blades bearing on said header tanks of the heat exchanger to maintain said header tanks against the tubes while allowing for thermal expansion of the tubes and corrugated fins.

5. An installation as set forth in claim 1, wherein studs made of earthenware, glass or quartz are placed on said horizontal plates of said holder and protrude into said holder to keep apart and isolate said horizontal plates of said holder from the heat exchanger.

6. An installation for use in brazing by gas flow elongated heat exchangers having a piling of tubes separated by corrugated fins and enclosed between side flanges, comprising:

a jig with a lower member and an upper member connected by transverse elements, said transverse elements supporting at least one holder;

said holder comprising two horizontally extending plate elements, mounted on said transverse elements and abutting said transverse elements at one end of each of said horizontal plate elements, said plate elements being slightly movable and spaced apart by a distance slightly smaller than the width of the heat exchangers placed therebetween for brazing, whereby said plate elements slightly urge said side flanges, corrugated fins and tubes together during brazing while allowing enough expansion of said side flanges, corrugated fins and tubes due to the heat of brazing to prevent deformation of said side flanges, corrugated fins and tubes;

means for passing hot gas through the corrugated fins and tubes of the heat exchanger while the heat exchanger is in said holder; and wherein said horizontally extending plates of said holder form a U-shaped elongated clamp, having upper and lower sides connected by a base portion, and said holder is provided with apertured openings in said upper and lower sides and said base portion thereby facilitating gas flow over the heat exchangers and decreasing the heat inertia of said holder.

7. An installation as set forth in claim 6, further comprising shims supported by said transverse elements and on which said holder is movably mounted.

8. An installation for use in brazing by gas flow elongated heat exchangers having a piling of tubes separated by corrugated fins and enclosed between side flanges, comprising:

a jig with a lower member and an upper member connected by transverse elements, said transverse elements support at least one holder;

said holder comprising two horizontally extending plate elements, mounted on said transverse elements and abutting said transverse elements at one end of each of said horizontal plate elements, said plate elements being slightly movable and spaced apart by a distance slightly smaller than the width of the heat exchangers placed therebetween for brazing, whereby said plate elements slightly urge said side flanges, corrugated fins and tubes together during brazing while allowing enough expansion of said side flanges, corrugated fins and tubes due to the heat of brazing to prevent deformation of said side flanges, corrugated fins and tubes;

means for passing hot gas through the corrugated fins and tubes of the heat exchanger while the heat exchanger is in said holder; and wherein said transverse elements comprise thin directing blades mounted to have the narrowest width thereof abutting said horizontally extending plate elements.

9. An installation for use in brazing by gas flow elongated heat exchangers having a piling of tubes separated by corrugated fins and enclosed between said flanges, comprising:

a jig with a lower member and an upper member connected by transverse elements, said transverse elements upporting at least one holder;

said holder comprising two horizontally extending plate elements, mounted on said transverse elements and abutting said transverse elements at one end of each of said horizontal plate elements, said plate elements being slightly movable and spaced apart by a distance slightly smaller than the wide of the heat exchangers placed therebetween for brazing, whereby said plate elements slightly urge said side flanges, corrugated fins and tubes together during brazing while allowing enough expansion of said side flanges, corrugated fins and tubes due to the heat of brazing to prevent deformation of said side flanges, corrugated fins and tubes;

means for passing hot gas through the corrugated fins and tubes of the heat exchanger while the heat exchanger is in said holder; and wherein said transverse elements are composed of tubes of an oblong cross section mounted to have their narrow widths transverse to the direction of said gas flow.

10. An installation as set forth in claim 6, wherein Said upper and lower members include elements for supporting removable locking bars extending on the side of the holders which is opposite to the side thereof placed against said transverse members.

11. An installation as set forth in claim 6 wherein said holder is made of a material having a heat expansion coefficient smaller than that of the metal constituting the heat exchanger, whereby the difference of heat expansion of said heat exchangers and said holder causes a resilient tightening of said heat exchangers during the heating to which the heat exchangers are submitted during brazing.

12. An installation as set forth in claim 6, wherein studs made of earthenware, glass or quartz are placed on said horizontal plates of said holder and protrude into said holder to keep apart and isolate said horizontal plates of said holder from the heat exchanger.

13. An installation as set forth in claim 1, wherein the ends of said upper and lower plates spaced apart from said transverse elements are bent outwardly to increase slightly the opening between said upper and lower plates at said ends thereof, thereby facilitating insertion therein of the heat exchangers.

14. An installation as set forth in claim 6, wherein the ends of horizontally extending plates spaced apart from said base portion are bent outwardly to increase slightly the opening between said upper and lower plates at said ends thereof, thereby facilitating insertion therein of the heat exchangers.

* * * * *